US012804250B2

(12) United States Patent
Imaya

(10) Patent No.: US 12,804,250 B2
(45) Date of Patent: Nov. 17, 2026

(54) ELECTRONIC APPARATUS, METHOD OF CONTROLLING THE SAME, AND STORAGE MEDIUM

(71) Applicant: CANON KABUSHIKI KAISHA, Tokyo (JP)

(72) Inventor: Shu Imaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/242,356

(22) Filed: Jun. 18, 2025

(65) Prior Publication Data

US 2025/0392806 A1 Dec. 25, 2025

(30) Foreign Application Priority Data

Jun. 21, 2024 (JP) ................................ 2024-100267

(51) Int. Cl.
*H04N 23/62* (2023.01)
*H04N 23/81* (2023.01)

(52) U.S. Cl.
CPC ............. *H04N 23/62* (2023.01); *H04N 23/81* (2023.01)

(58) Field of Classification Search
CPC ............................... H04N 23/62; H04N 23/81
See application file for complete search history.

(56) References Cited

U.S. PATENT DOCUMENTS 8,885,882 B1 * 11/2014 Yin ........................ G06V 40/19 382/103
11,868,523 B2 * 1/2024 Rodgers ............. G02B 27/0093
2021/0001723 A1 * 1/2021 Nishiyori ............... B60K 35/10
2022/0353431 A1 * 11/2022 Inagaki ................... G06F 3/013
2023/0076475 A1 * 3/2023 Tamaki ................ H04N 23/675
2023/0125838 A1 * 4/2023 Horie ................... H04N 23/611 348/169
2024/0398224 A1 * 12/2024 Nistico ................ A61B 3/0025
2025/0322760 A1 * 10/2025 Tokay .................. G06V 10/766
2025/0341890 A1 * 11/2025 Strandborg ............. G06F 3/013

FOREIGN PATENT DOCUMENTS

JP 2021132272 A 9/2021
JP 2023004678 A 1/2023

* cited by examiner

*Primary Examiner* — Shahbaz Nazrul
(74) *Attorney, Agent, or Firm* — Canon U.S.A IP Division

(57) ABSTRACT

An electronic apparatus includes one or more memories, and one or more processors in communication with the one or more memories, wherein the one or more processors and the one or more memories are configured to, acquire line-of-sight information including a line-of-sight position of a line of sight of a user who looks at a display unit, correct the acquired line-of-sight position by performing filter processing, determine whether a line-of-sight state is any one of at least two or more line-of-sight states depending on a line-of-sight speed and an amount of a line-of-sight movement included in the acquired line-of-sight information, perform control to execute processing of displaying an image based on the corrected line-of-sight position, and perform control to change a parameter for the filter processing to be used in the correction based on the determined line-of-sight state.

13 Claims, 13 Drawing Sheets

ELECTRONIC APPARATUS, METHOD OF CONTROLLING THE SAME, AND STORAGE MEDIUM

BACKGROUND

Field of the Disclosure

The present disclosure relates to an electronic apparatus, a method of controlling the electronic apparatus, and a storage medium.

Description of the Related Art

In recent years, there has been an electronic apparatus that uses information regarding a user's line of sight as a user interface in various fields. Such an electronic apparatus displays a line-of-sight pointer at a position of the line of sight to allow the user to visually recognize a line-of-sight detection result. However, if the line-of-sight pointer is displayed using the line-of-sight detection result as it is, the line-of-sight pointer jitter increases when there is a large amount of fixational eye movement or when the line-of-sight detection results vary greatly, resulting in uncomfortable display for the user.

Japanese Patent Application Laid-Open No. 2021-132272 discusses an electronic apparatus that performs processing (e.g., averaging) on a detected line-of-sight position to generate processed line-of-sight information and uses the processed line-of-sight information to display the line-of-sight position. In Japanese Patent Application Laid-Open No. 2023-4678 discloses a processing apparatus that corrects line-of-sight information using a Kalman filter with a low-order polynomial regression.

Even when the processed line-of-sight information generated by the processing, such as averaging, is used to display the line-of-sight position as in the electronic apparatus discussed in Japanese Patent Application Laid-Open No. 2021-132272, the line-of-sight pointer jitter displayed at the line-of-sight position may be noticeable.

When the Kalman filter is used as in the processing apparatus disclosed in Japanese Patent Application Laid-Open No. 2023-4678, a significant delay may occur in display of the line-of-sight pointer at the line-of-sight position based on a filter processing result.

SUMMARY

The present disclosure is directed to reducing jitter and delay of an image to be displayed based on the line-of-sight position.

According to an aspect of the present disclosure, an electronic apparatus includes one or more memories, and one or more processors in communication with the one or more memories, wherein the one or more processors and the one or more memories are configured to, acquire line-of-sight information including a line-of-sight position of a line of sight of a user who looks at a display unit, correct the acquired line-of-sight position by performing filter processing, determine whether a line-of-sight state is any one of at least two or more line-of-sight states depending on a line-of-sight speed and an amount of a line-of-sight movement included in the acquired line-of-sight information, perform control to execute processing of displaying an image based on the corrected line-of-sight position, and perform control to change a parameter for the filter processing to be used in the correction based on the determined line-of-sight state.

BRIEF DESCRIPTION OF THE DRAWINGS

Further features of the present disclosure will become apparent from the following description of exemplary embodiments with reference to the attached drawings.

FIG. 6B is a schematic diagram illustrating luminance distribution in a region a.

DESCRIPTION OF THE EMBODIMENTS

An exemplary embodiment of the present disclosure will now be described with reference to the drawings.

<Description of Outer Appearance>

Figure 1A:
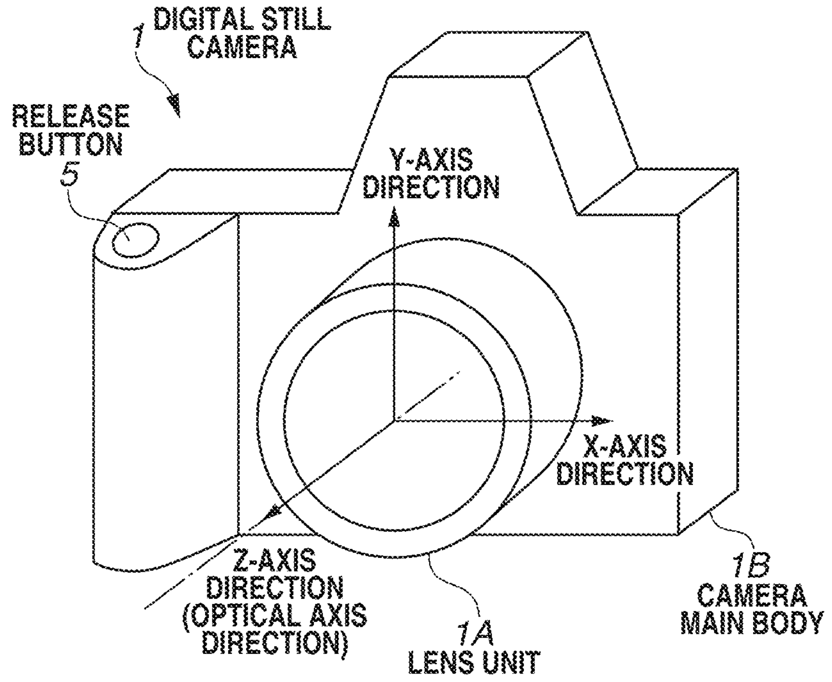
FIGS. 1A and 1B are perspective views each illustrating an example of an outer appearance of a digital still camera as an example of an imaging apparatus according to one or more aspects of the present disclosure.
Figure 1B:
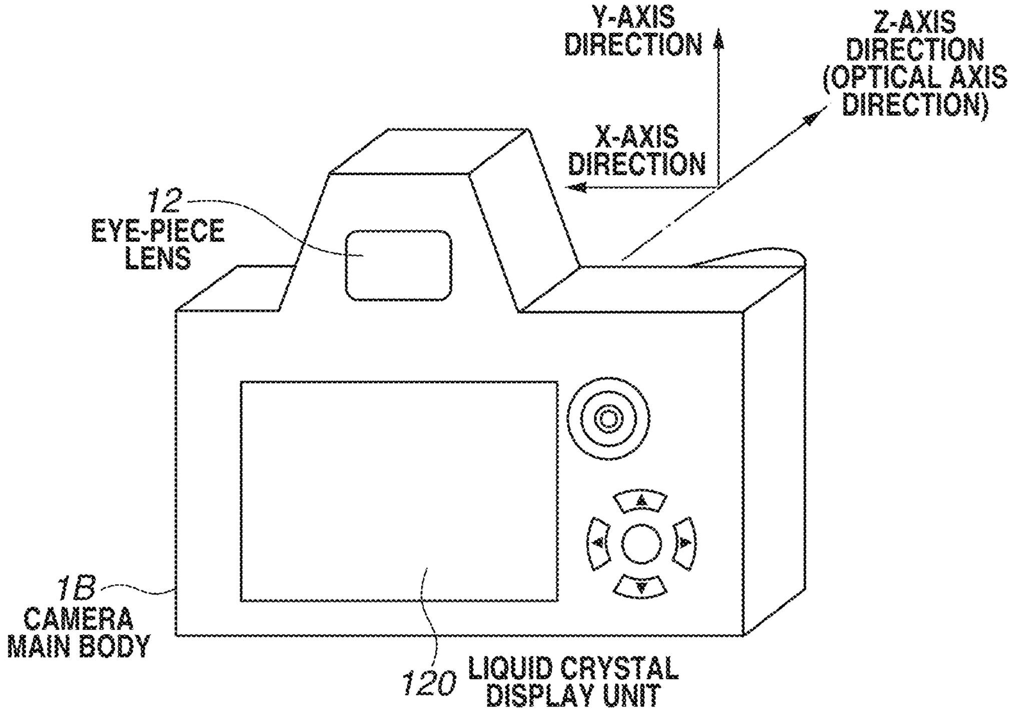

FIGS. 1A and 1B are perspective views each illustrating an example of an outer appearance of a digital still camera (hereinafter referred to as a "camera") 1 according to the present exemplary embodiment. FIG. 1A is a perspective view when viewed from the front. FIG. 1B is a perspective view when viewed from the back.

In FIGS. 1A and 1B, an XYZ orthogonal coordinate system is defined as a camera coordinate system, in which the optical axis of a lens unit 1A is a Z-axis, an axis in a vertical direction orthogonal to the Z-axis is a Y-axis, and an axis orthogonal to the Z- and Y-axes is an X-axis. The origin of the camera coordinate system may be, for example, an intersection point between an imaging plane and the optical axis, but is not limited thereto.

The camera 1 includes a camera main body 1B and the lens unit 1A detachably mounted on the camera main body 1B. A release button 5 is an operation member that receives an imaging instruction from a user. An operation member, such as the release button 5, is hereinafter referred to as an "operation unit". An eye-piece lens 12 for the user to look into a display element with, which is included in the camera 1 and will be described below, is disposed on the back of the camera 1. This allows the user to look into the eye-piece lens 12 to visually recognize a field-of-view image.

<Description of Configuration>

Figure 2:
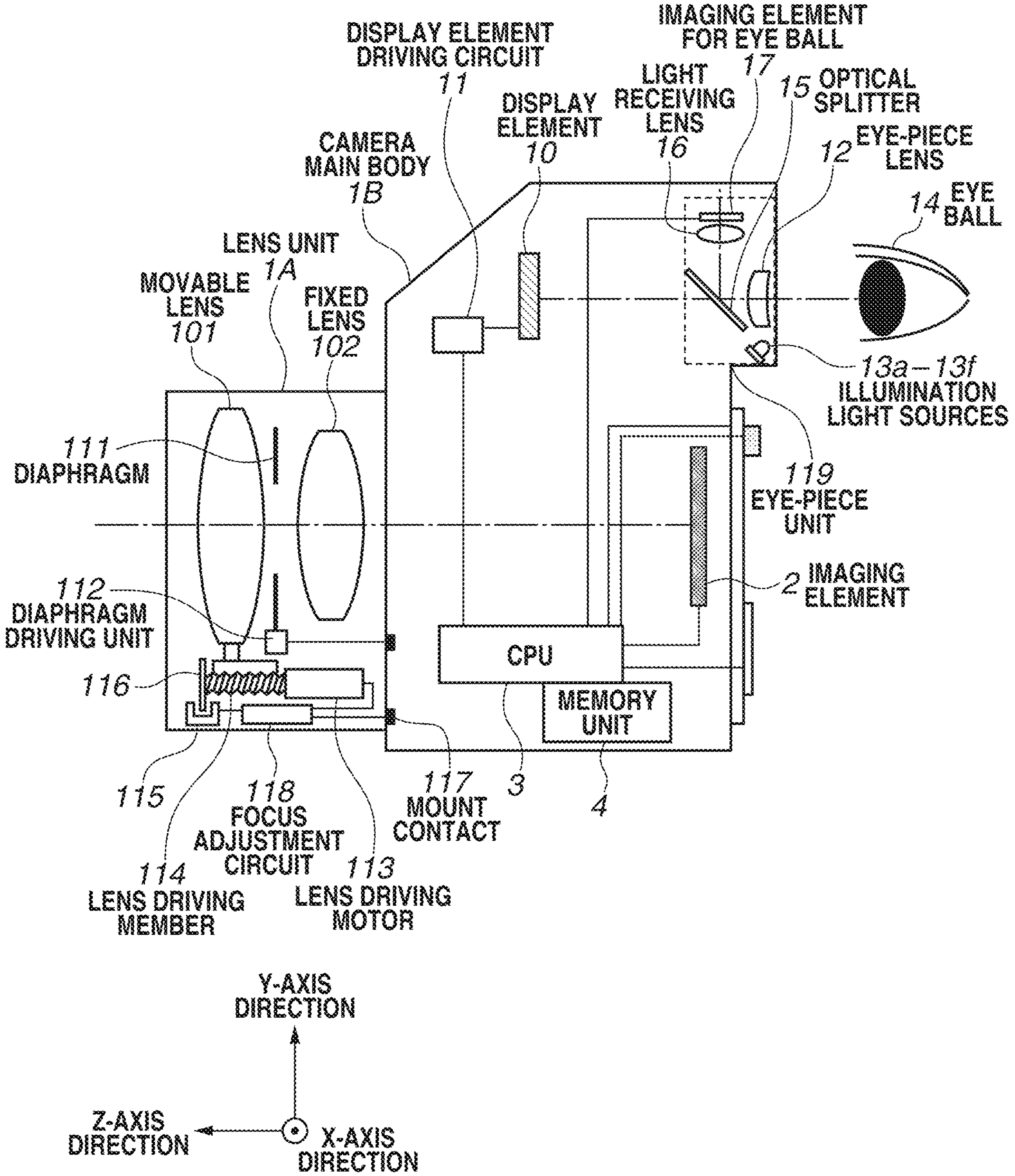
FIG. 2 is a cross-sectional view illustrating a configuration example of the digital still camera as the example of the imaging apparatus according to one or more aspects of the present disclosure.

FIG. 2 is a cross-sectional view illustrating a configuration example of the camera 1 as an example of an imaging apparatus according to the present exemplary embodiment. FIG. 2 is a cross-sectional view illustrating a cross section of the camera 1 cut along a YZ plane formed by the Y- and Z-axes illustrated in FIGS. 1A and 1B.

In FIGS. 1A, 1B, and 2, like numbers refer to like elements.

When the lens unit 1A is mounted on the camera main body 1B, the lens unit 1A and the camera main body 1B are electrically connected to each other through a mount contact 117. Power is supplied to the lens unit 1A from the camera main body 1B through the mount contact 117. The circuitry in the lens unit 1A is communicable with a central processing unit (CPU) 3 in the camera main body 1B through the mount contact 117.

The lens unit 1A includes a movable lens 101 and a fixed lens 102. The movable lens 101 and the fixed lens 102 are each illustrated as a single lens in FIG. 2, but each constitutes a plurality of lenses in reality.

It is on the assumption that the movable lens 101 is a focus lens, but the movable lens 101 can include other movable lens, such as a variable magnification lens and an image stabilization lens.

The movable lens 101 is supported by a lens driving member 114, and is driven by a lens driving motor 113 in the optical axis directions (the horizonal directions of the drawing). A photocoupler 115 detects rotation of a pulse plate 116 that moves in conjunction with the lens driving member 114 and outputs the rotation to a focus adjustment circuit 118. The focus adjustment circuit 118 is capable of detecting a driving amount and a driving direction of the movable lens 101 based on the output from the photocoupler 115. Upon receiving an instruction regarding the driving amount and the driving direction of the movable lens 101 from the CPU 3 in the camera main body 1B, the focus adjustment circuit 118 controls the operation of the lens driving motor 113 based on the output from the photocoupler 115.

In the camera main body 1B, an imaging element 2 is a charge-coupled device (CCD) image sensor or a complementary metal-oxide semiconductor (CMOS) image sensor. A plurality of pixels is two-dimensionally disposed in the imaging element 2, and each pixel includes one microlens, one color filter, and one or more photoelectric conversion units. In the present exemplary embodiment, each pixel includes a plurality of photoelectric conversion units, and each of the photoelectric conversion units is capable of reading signals. This configuration of the pixel makes it possible to generate image signals for captured images, pairs of parallax images, and phase difference autofocus (AF) from the signals read from the imaging element 2. The imaging element 2 converts an optical image formed by the lens unit 1A into a pixel signal group (analog image signals) by photoelectrical conversion in the plurality of pixels. In the present exemplary embodiment, the imaging element 2 has an analog to digital (A/D) conversion function, which converts the analog image signals into digital image data, and outputs the digital image data.

A memory unit 4 includes a non-volatile memory (i.e., read-only memory (ROM)) and a volatile memory (i.e., random-access memory (RAM))). The CPU 3 loads programs stored in the ROM into the RAM, and executes the programs to control the operations of the camera main body 1B and the lens unit 1A and carry out camera functions. The memory unit 4 includes a recording medium (for example, a memory card) for recording image data and audio data obtained by imaging. The CPU 3 controls the operations of the focus adjustment circuit 118 and a diaphragm driving unit 112 through the mount contact 117.

The non-volatile memory in the memory unit 4 may be rewritable. The non-volatile memory stores programs executed by the CPU 3, various kinds of setting values, graphical user interface (GUI) image data, line-of-sight correction data for correcting individual differences in line of sight, and the like.

A display element 10 is a liquid crystal display (LCD) or an organic electroluminescent (EL) display panel, and displays captured images, such as live view images, a menu screen, various kinds of information, and the like.

A display element driving circuit 11 drives the display element 10 based on a control by the CPU 3. The display element 10 is provided inside the camera main body 1B, and thus includes an eye-piece unit for looking at the display element 10 from the outside of the camera main body 1B. An eye-piece unit 119 includes the eye-piece lens 12 and illumination light sources **13*a* to 13*f* for detecting a line of sight. The eye-piece unit 119 also includes an optical splitter 15 for capturing an eyeball image, a light-receiving lens 16, and an imaging element for an eyeball 17 (hereinafter, referred to as an eyeball imaging element 17**).

The illumination light sources **13*a* to 13*f* are a plurality of light emitting diodes (LEDs) provided on the periphery of the eye-piece lens 12, and illuminate an eyeball 14 of the user who is looking into the eye-piece unit 119 with infrared light. An image of the eyeball obtained by the infrared light from the illumination light sources 13*a* to 13*f* reflecting off the eyeball 14 is reflected by the optical splitter 15 and captured by the eyeball imaging element 17 through the light-receiving lens 16 provided above the optical splitter 15. The light-receiving lens 16 positions the pupil of the user's eyeball 14 and the eyeball imaging element 17 in a conjugate image-forming relationship. The eyeball imaging element 17 includes a plurality of pixels arranged in a two-dimensionally array and is configured to capture images with infrared light. The number of pixels in the eyeball imaging element 17 may be smaller than that in the imaging element 2. The line of sight of the eyeball 14 can be detected based on a positional relationship between the corneal reflex and the pupil in the eyeball image obtained by the eyeball imaging element 17**.

<Description of Block Diagram>

Figure 3:
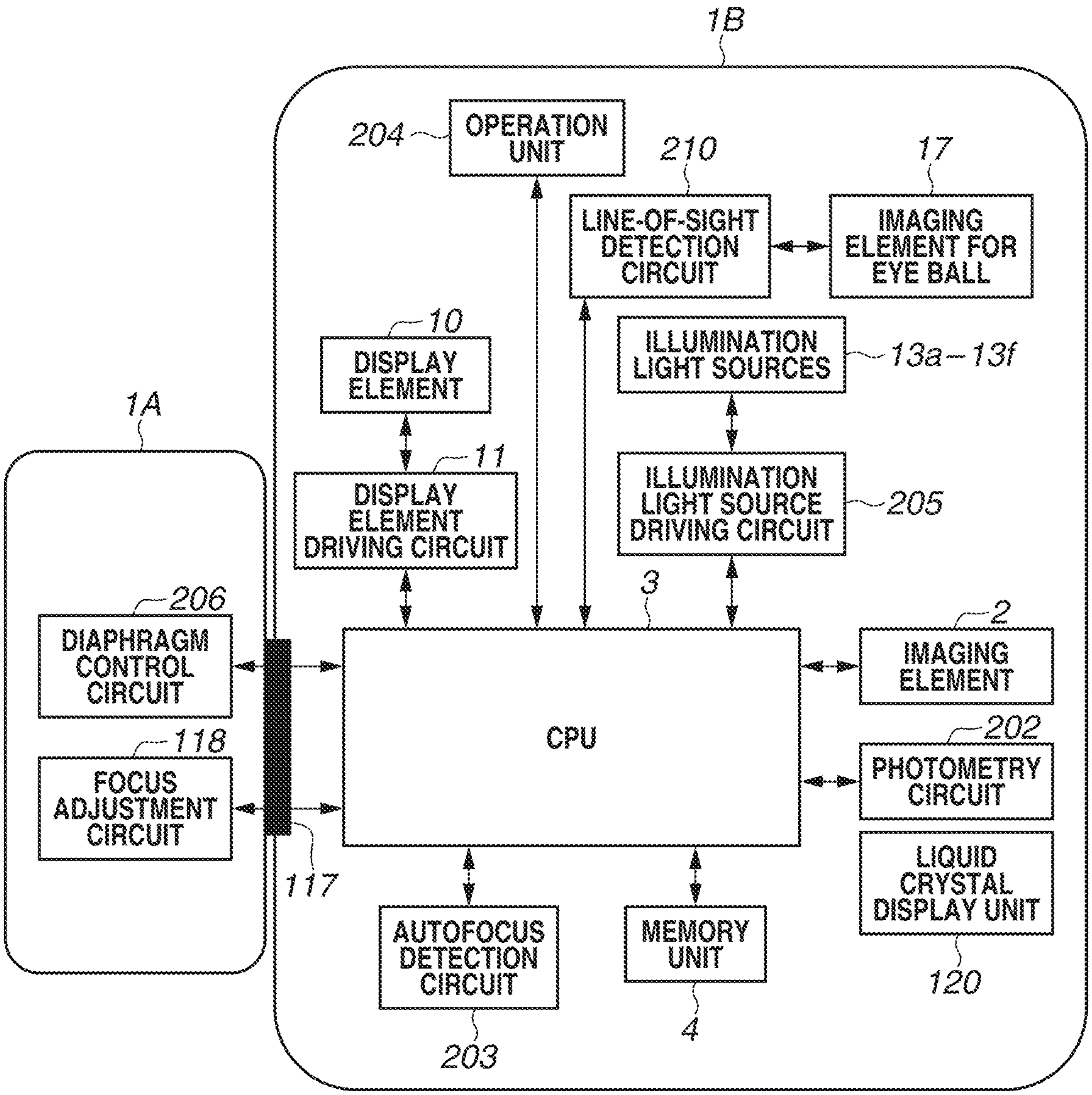
FIG. 3 is a block diagram illustrating a configuration example of the digital still camera as the example of the imaging apparatus according to one or more aspects of the present disclosure with a focus on an electric circuit.

FIG. 3 is a block diagram illustrating a configuration example of the camera 1 according to the present exemplary embodiment with a focus on an electric circuit. A line-of-sight detection circuit 210, a photometry circuit 202, an autofocus detection circuit 203, an operation unit 204, the display element driving circuit 11, an illumination light source driving circuit 205, and a liquid crystal display unit 120 are connected to the CPU 3. The focus adjustment circuit 118 and a diaphragm control circuit 206 (included in the diaphragm driving unit 112), which are provided in the lens unit 1A, are electrically connected to the CPU 3 through the mount contact 117.

A line-of-sight detection circuit 210 performs A/D conversion to convert analog image signals of the eyeball image obtained from the eyeball imaging element 17 into digital image data, and transmits the digital image data to the CPU 3. The CPU 3 detects feature points necessary for line-of-sight detection from the digital image data on the eyeball image based on a publicly known algorithm, and detects the user's line-of-sight position from the position of each feature point.

The photometry circuit 202 generates luminance information as a predetermined evaluation value for exposure control based on image data obtained from the imaging element 2, and outputs the luminance information to the CPU 3. The CPU 3 performs automatic exposure control (AE) processing based on the luminance information to determine an imaging condition. The imaging condition includes a shutter speed, an aperture value, and a sensitivity in a case of still-image capturing. The CPU 3 controls the aperture value (an amount of opening area) of a diaphragm 111 in the lens unit 1A based on the determined imaging condition. The CPU 3 also controls the operation of a mechanical shutter in the camera main body 1B.

The autofocus detection circuit 203 generates an image signal for phase difference AF based on image data obtained from the imaging element 2, and outputs the image signal for phase difference AF to the CPU 3. The CPU 3 calculates a defocus amount based on the phase difference of the image signal for phase difference AF. This is a publicly known technique as imaging plane phase difference AF. In the present exemplary embodiment, it is on the assumption that 180 focus detection points on an imaging plane corresponding to positions in a viewfinder image (described below) illustrated in FIG. 4, but the number of focus detection points is not limited thereto.

The operation unit 204 is a collective term of a plurality of input devices (such as a button, a switch, and a dial) including the above-described release button 5 operatable by the user. When detecting an operation of an input device, the CPU 3 performs processing corresponding to the detected operation.

The release button 5 includes a first shutter switch (SW1) that turns on when half-pressed and a second shutter switch (SW2) that turns on when fully pressed. When detecting that the SW1 is turned on, the CPU 3 performs a preparation operation for still-image capturing. The preparation operation includes AE processing and AF processing. When detecting that the SW2 is turned on, the CPU 3 performs still-image capturing and a recording operation according to the imaging condition determined in the AE processing.

The illumination light source driving circuit 205 controls the flash operations of the illumination light sources 13*a* to 13*f* based on a control of the CPU 3.

The liquid crystal display unit 120 performs a display on a display device, such as an LCD or an organic EL display based on a signal from the CPU 3.

Figure 4:
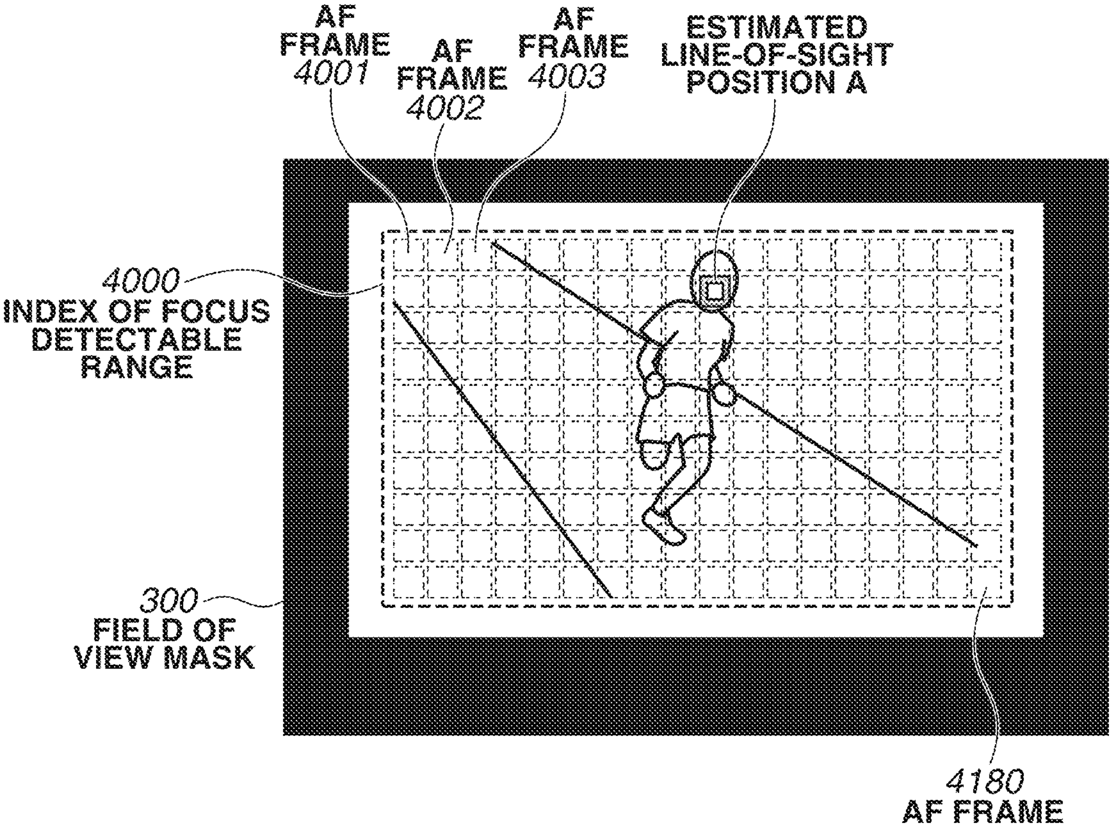
FIG. 4 illustrates an example of a viewfinder image observed through an eye-piece lens according to one or more aspects of the present disclosure.

FIG. 4 is a view illustrating an example of a viewfinder image according to the present exemplary embodiment. The viewfinder image described herein is an image displayed on the display element 10, and various types of indexes are superimposed on the image. The user can look at the viewfinder image illustrated in FIG. 4 through the eye-piece lens 12. FIG. 4 illustrates a field of view within the viewfinder, indicating a state where the display element 10 is operating.

FIG. 4 illiterates a field of view mask 300, an index of a focus detectable range 400, and 180 indexes (AF frames) 4001 to 4180 displayed at positions corresponding to respective focus detectable points (focus detection points). An AF frame corresponding to the current line-of-sight position out of these AF frames is highlighted as an estimated line-of-sight position A. The highlighted AF frame A in FIG. 4 is an image displayed based on the line-of-sight position.

<Description of Line-of-Sight Detection Processing>

Line-of-sight detection processing will now be described with reference to FIGS. 5, 6A, 6B and 7.

Figure 5:
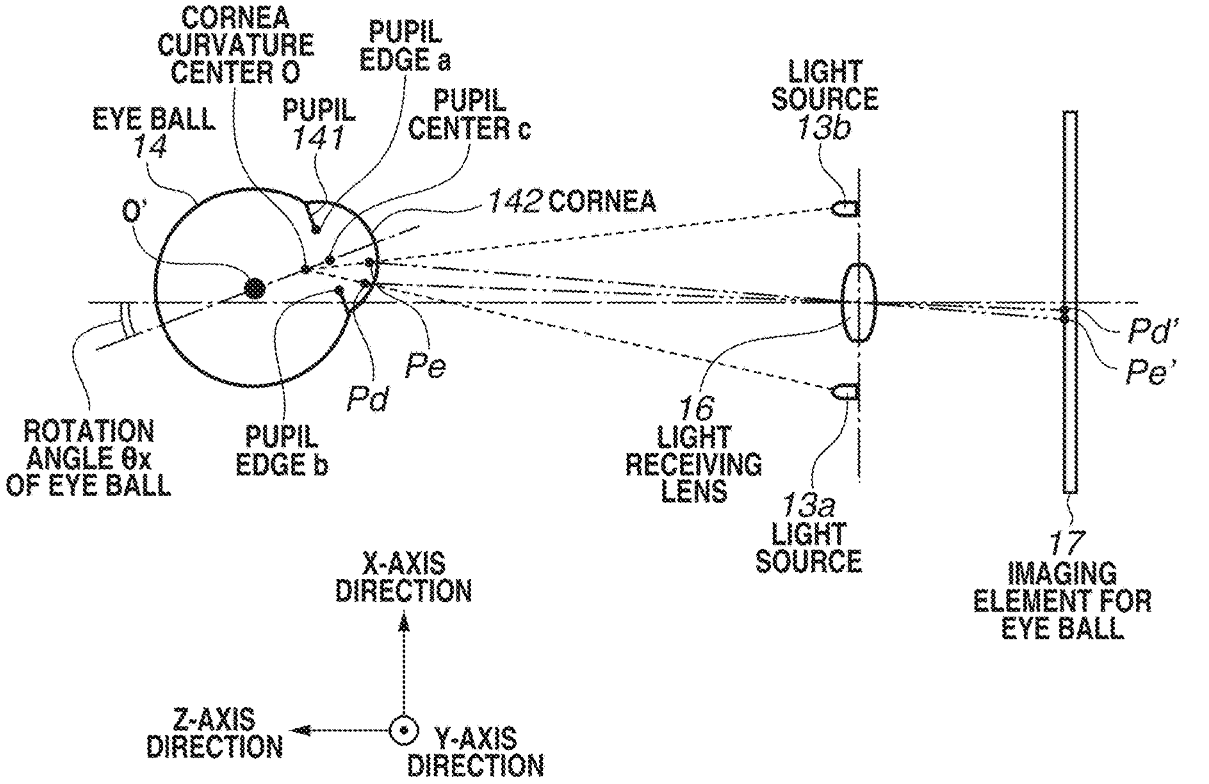
FIG. 5 illustrates the principle of line-of-sight detection.

FIG. 5 illustrates the principle of line-of-sight detection. The illumination light sources 13*a* to 13*f* are arranged substantially symmetric about the optical axis of the light-receiving lens 16, and emit infrared light toward the user's eyeball 14. FIG. 5 illustrates the illumination light sources 13*a* and 13*b* alone. The light-receiving lens 16 forms the eyeball image with infrared light reflected by the eyeball 14 on the imaging plane of the eyeball imaging element 17.

Figure 6A:
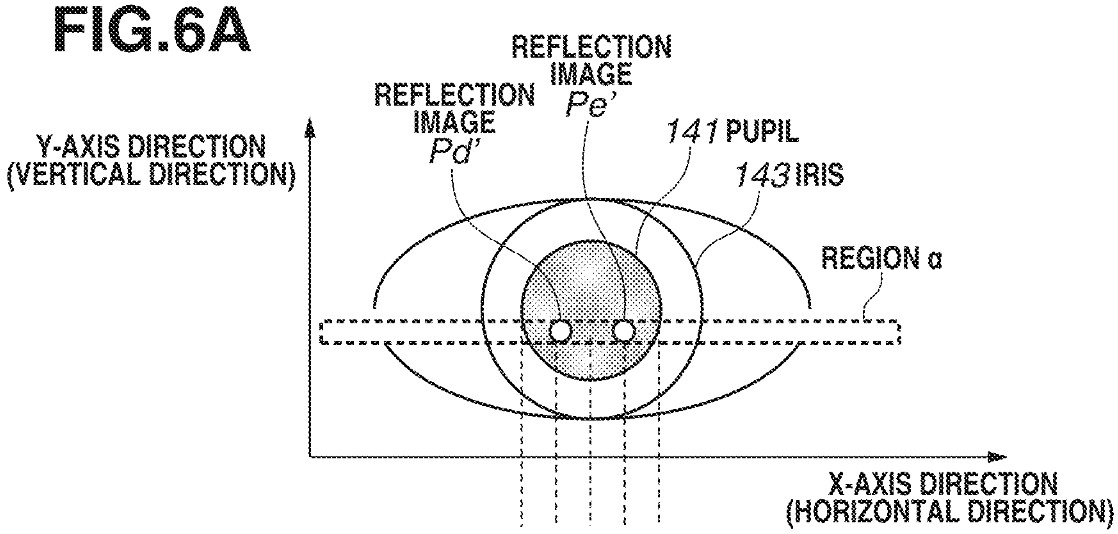
FIG. 6A is a schematic diagram illustrating an eyeball image formed by a light-receiving lens.
Figure 6B:
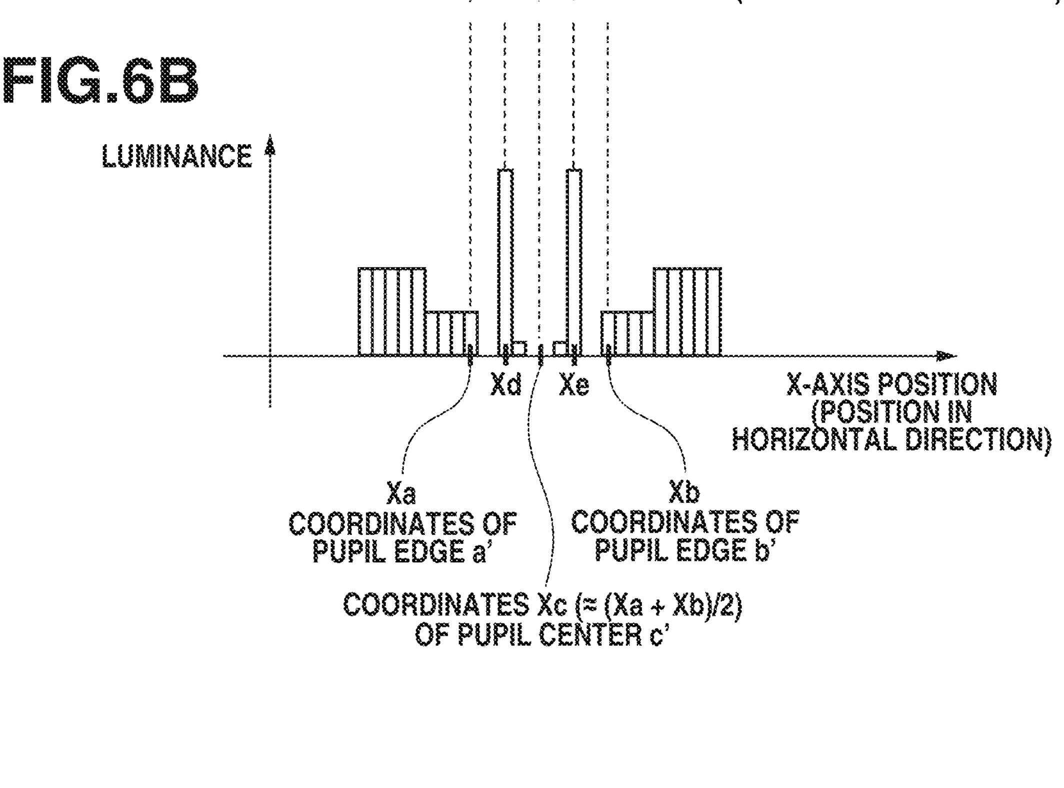

FIG. 6A is a schematic diagram illustrating the eyeball image formed by the light-receiving lens 16. FIG. 6B is a schematic diagram illustrating luminance distribution in a region a in FIG. 6A.

Figure 7:
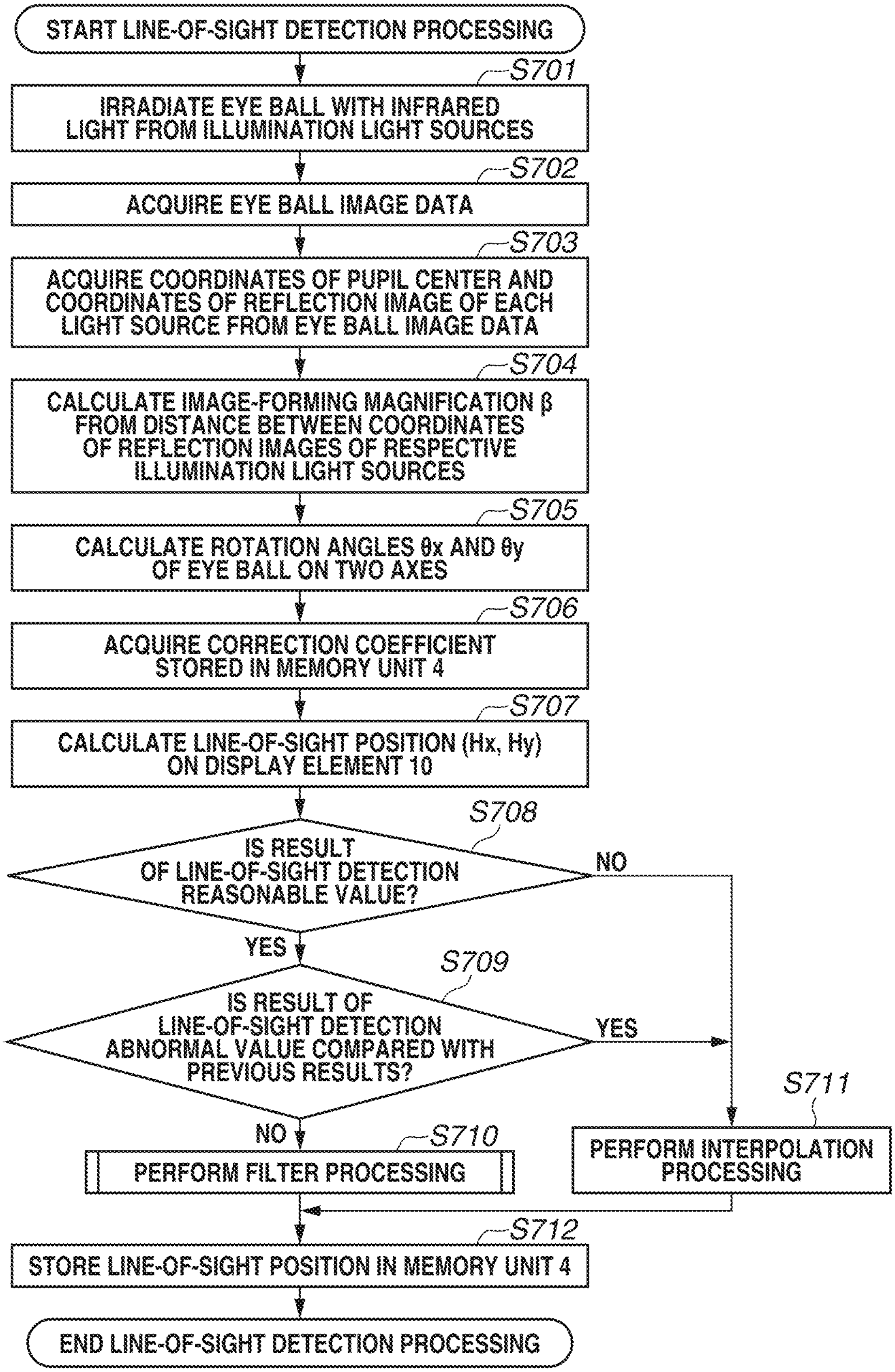
FIG. 7 is a flowchart illustrating line-of-sight detection processing according to one or more aspects of the present disclosure.

FIG. 7 is a flowchart illustrating the line-of-sight detection processing according to the present exemplary embodiment. The line-of-sight detection processing can be performed, for example, when it is detected that an object is close to the eye-piece lens 12. A state where an object is close to the eye-piece lens 12 can be detected using a publicly known method, such as a proximity sensor disposed in the vicinity of the eye-piece lens 12. The line-of-sight detection processing can be started in response to a user's instruction via the operation unit 204. The CPU 3 controls each unit to execute the processing in FIG. 7.

In step S701, the CPU 3 turns on one or more of the illumination light sources 13*a* to 13*f* through the illumination light source driving circuit 205. Here, it is on the assumption that the illumination light sources 13*a* and 13*b* illustrated in FIG. 5 are turned on for convenience. With this operation, infrared light is emitted from the illumination light sources 13*a* and 13*b* toward the outside of the camera main body 1B. The infrared light is reflected by the eyeball of the user who is looking into the eye-piece lens 12, further reflected by the optical splitter 15, and then enters the light-receiving lens 16.

In step S702, the CPU 3 captures an image using the eyeball imaging element 17. The eyeball image formed by the light-receiving lens 16 is converted into image signals using the eyeball imaging element 17. The image signals are subjected to A/D conversion using the line-of-sight detection circuit 210 and input to the CPU 3 as eyeball image data.

In step S703, the CPU 3 obtains coordinates of a corneal reflex image Pd' of the illumination light source 13*a*, coordinates of a corneal reflex image Pe' of the illumination light source 13*b*, and coordinates of an image c' of the pupil center c from the eyeball image data acquired in step S702.

The eyeball image obtained by the eyeball imaging element 17 includes the reflection image Pd' corresponding to an image Pd of the illumination light source 13*a* and the reflection image Pe' corresponding to an image Pe of the illumination light source 13*b* reflected on a cornea 142 (FIG. 5).

As illustrated in FIG. 6A, the horizontal direction is defined as the X-axis and the vertical direction is defined as the Y-axis. In this case, an X-axis coordinate of the center of the reflection image Pd' of the illumination light source 13*a* is defined as Xd and an X-axis coordinate of the center of the reflection image Pe' of the illumination light source 13b is defined as Xe. The reflection images Pd' and Pe' are included in the eyeball image. An X-axis coordinate of an image a' of a pupil edge a is defined as Xa, and an X-axis coordinate of an image b' of a pupil edge b is Xb. The pupil edges a and b are edge portions of a pupil 141.

As illustrated in FIG. 6B, the luminance at the coordinates Xd and Xe respectively corresponding to the reflection images Pd' of the illumination light source 13a and the reflection image Pe' of the illumination light source 13b is extremely higher than the luminance in other positions. In contrast, the luminance in the range from the coordinate Xa to the coordinate Xb corresponding to a region of the pupil 141 is extremely low excluding the coordinates Xd and Xe. In a region corresponding to a region of an iris 143 outside the pupil 141, where the coordinate values are smaller than that of Xa and larger than that of Xb, the luminance is intermediate between the luminance of the reflection images of the illumination light sources and the luminance of the pupil 141.

The CPU 3 is capable of detecting the X-axis coordinate Xd of the reflection image Pd' of the illumination light source 13a, the X-axis coordinate Xe of the reflection image Pe' of the illumination light source 13b, the X-axis coordinate Xa of the image a' of the pupil edge a, and the X-axis coordinate Xb of the image b' of the pupil edge b from the eyeball image based on such characteristics of luminance levels in the X-axis direction. In applications, such as the present exemplary embodiment, a rotation angle θx of the optical axis of the eyeball 14 with respect to the optical axis of the light-receiving lens 16 is relatively small. In this case, a X-axis coordinate Xc of the image c' of the pupil center c in the eyeball image can be expressed as Xc≈(Xa+Xb)/2. In this manner, the CPU 3 is capable of obtaining the coordinate of the reflection image Pd' of the illumination light source 13a, the coordinate of the reflection image Pe' of the illumination light source 13b, and the X-axis coordinate of the image c' of the pupil center c from the eyeball image.

In step S704, the CPU 3 calculates an image-forming magnification β of the eyeball image. β is a magnification determined by the position of the eyeball 14 with respect to the light-receiving lens 16, and can be obtained as a function of an interval (Xd−Xe) between the reflection image Pd' of the illumination light source 13a and the reflection image Pe' of the illumination light source 13b.

In step S705, the CPU 3 calculates a rotation angle of the eyeball 14. An X-axis coordinate at a midpoint on the cornea 142 between the image Pd of the illumination light source 13a and the image Pe of the illumination light source 13b almost matches with an X-axis coordinate of the curvature center O of the cornea 142.

Thus, a standard distance between the curvature center O of the cornea 142 and the center c of the pupil 141 is considered to be Oc, the rotation angle θx of the optical axis of the eyeball 14 in a Z-X plane can be obtained by a relational expression of β *Oc*SIN θx≈{(Xd+Xe)/2)}−Xc.

While FIGS. 5, 6A, and 6B each illustrate an example of calculating the rotation angle θx in a plane perpendicular to the Y-axis, a rotation angle θy in a plane perpendicular to the X-axis can be calculated in the same manner. In this manner, the CPU 3 obtains the rotation angles θx and θy of the eyeball 14. A line-of-sight position can be calculated from a rotation angle of the eyeball 14.

In step S706, the CPU 3 acquires a correction coefficient from the memory unit 4. The correction coefficient is a coefficient for correcting individual differences in users' lines of sight. The correction coefficient is generated by a calibration operation, and stored in the memory unit 4 before the line-of-sight detection processing is started. When correction coefficients regarding a plurality of users are stored in the memory unit 4, the CPU 3 uses a correction coefficient corresponding to a current user by, for example, inquiring to the user at a desired timing.

In step S707, the CPU 3 uses the rotation angles θx and θy of the eyeball 14 calculated in step S705 to calculate the user's line-of-sight coordinates (the line-of-sight position) on the display element 10. The user's line-of-sight position is considered to be the coordinates (Hx, Hy) corresponding to those of the center c of the pupil 141 on the display element 10, and can be calculated by an expression of Hx=m×(Ax×θx+Bx) and an expression of Hy=m×(Ay×θy+By).

Here, a coefficient m is a conversion coefficient that converts the rotation angles θx and θy into coordinates corresponding to those of the center c of the pupil 141 on the display element 10, and can be determined by characteristics of the eye-piece lens 12 of the viewfinder optical system of the camera 1. The coefficient m can be preliminarily stored in the memory unit 4. Correction coefficients Ax, Bx, Ay, and By are acquired in step S706.

In step S708, the CPU 3 determines whether the acquired result of the line-of-sight detection processing indicates reasonable values. Here, the CPU 3 acquires, as the result of the line-of-sight detection processing, the line-of-sight position (Hx, Hy), the interval between the reflection images Pd' and Pe', or (Xd−Xe), and the interval between the pupil edge images a' and b', or (Xa−Xb).

For example, in a case of the human eye, the size of a pupil is 2 to 6 mm, and the size of a cornea is approximately 12 mm in diameter. In a case where a predetermined threshold is set to a value determined based on the size of a pupil of the human eye or the size of a cornea, if a value of the interval between the pupil edge images a' and b', or (Xa−Xb), or a value of the interval between the reflection images Pd' and Pe', or (Xd−Xe), obtained from the line-of-sight detection processing exceeds the predetermined threshold, the CPU 3 determines that the result of the line-of-sight detection processing does not indicate reasonable values. When the values are the predetermined thresholds or less, the CPU 3 determines that the result of the line-of-sight detection processing indicates reasonable values. If the CPU 3 determines that the result does not indicate reasonable values (NO in step S708), the processing proceeds to step S711. If the CPU 3 determines that the result of the line-of-sight detection processing indicates reasonable values (YES in step S708), the processing proceeds to step S709.

It is on the assumption that the predetermined threshold is a value determined based on a size of a screen of an electronic viewfinder (EVF) to be used. When the value of the line-of-sight position (Hx, Hy) obtained from the result of line-of-sight detection is more than the predetermined threshold, the CPU 3 determines that the result of the line-of-sight detection processing does not indicate a reasonable value. When the value is the threshold or less, the CPU 3 determines that the result of the line-of-sight detection processing indicates a reasonable value. If the CPU 3 determines that the result of the line-of-sight detection processing does not indicate a reasonable value (NO in step S708), the processing proceeds to step S711. If the CPU 3 determines that the result of the line-of-sight detection processing indicates a reasonable value (YES in step S708), the processing proceeds to step S709. If any one of indexes of a value of the interval (Xa-Xb) between the pupil edge images a' and b', a value of the interval (Xd-Xe) between the reflection images Pd' and Pe', and a line-of-sight position (Hx, Hy) is more than the predetermined threshold (YES in step S708), the processing proceeds to step S711.

In step S709, the CPU 3 compares an average value of results of the line-of-sight detection processing in the past and a value of the result of the line-of-sight detection processing at the current time to determine whether the result of the line-of-sight detection processing indicates an abnormal value based on the result of the comparison.

Specifically, the CPU 3 determines whether a value obtained by dividing the difference between the average value of the past line-of-sight detection processing results and the value of the current line-of-sight detection processing result by the average value of the past line-of-sight detection processing results (rate of change) is an abnormal value. It is on the assumption that the predetermined threshold is set based on a speed of contraction of a human pupil, a speed of eye movement, or the like. When the rate of change obtained from the line-of-sight detection processing result exceeds the predetermined threshold, the CPU 3 determines that the change is an abnormal change. When the rate of change is the predetermined threshold or less, the CPU 3 determines that the change is not an abnormal change. If the CPU 3 determines that the change is an abnormal change (value) (YES in step S709), the processing proceeds to step S711. If the CPU 3 determines that the change is not an abnormal change (value) (NO in step S709), the processing proceeds to step S710. The values to be compared are the coordinates of the reflection images Pd' and Pe', the coordinates of the image c' of the pupil center c, and the line-of-sight position (Hx, Hy), all of which are included in the line-of-sight detection processing result. If any one of the indexes of the coordinates of the reflection images Pd' and Pe', the coordinates of the image c' of the pupil center c, and the line-of-sight position (Hx, Hy) exceeds the predetermined threshold, the processing proceeds to step S711.

In step S710, the CPU 3 performs Kalman filter processing, which will be described below. The calculated line-of-sight position on the display element 10 is affected by line-of-sight detection error and fixational eye movement. If the detected line-of-sight position is displayed as it is on the display element 10 as a line-of-sight position, jitter of the line-of-sight position displayed on the display element 10 proportionally increases as the variation in line-of-sight detection is large. As a result, when the AF frames 4001 to 4003 and 4180 in FIG. 4 are changed based on the line-of-sight position, there are some cases where the AF frames 4001 to 4003 and 4180 cannot be changed into desired AF frames. When an image, such as a line-of-sight pointer, is displayed based on the line-of-sight position, the display may be uncomfortable for the user. Thus, it is necessary to perform Kalman filter processing on the calculated line-of-sight position (Hx, Hy) to reduce variations in line-of-sight detection and jitter of the line-of-sight position.

In step S711, the CPU 3 performs interpolation processing. For example, in the interpolation processing in step S711, the CPU 3 uses line-of-sight positions (Hx, Hy) in the past to perform linear interpolation and predict a current line-of-sight position. The predicted line-of-sight position is set as the current line-of-sight position.

In step S712, the CPU 3 records the line-of-sight position after the Kalman filter processing or after the interpolation processing in the memory unit 4, and the line-of-sight detection processing ends.

As described above, when the line-of-sight position is detected and stored in the memory unit 4, the CPU 3 displays the line-of-sight pointer indicating the line-of-sight position on the display element 10 based on the line-of-sight position information stored in the memory unit 4, and highlights the AF frame corresponding to the line-of-sight position.

The CPU 3 uses the coefficient m determined by characteristics of the eye-piece lens 12 in the viewfinder optical system of the camera 1 to convert the line-of-sight position stored in the memory unit 4 into coordinates corresponding to the center c of the pupil 141 on the display element 10. The CPU 3 then generates an image centered on the converted coordinates of the line of sight (the line-of-sight position), and displays the image on the display element 10. In this case, the image to be displayed includes the line-of-sight pointer indicating the line-of-sight position, and a subject detection frame, an AF frame, and highlighted display of a setting item, all of which are determined based on the line-of-sight position.

The CPU 3 changes the focus detection point (the AF frame) to be used in the autofocus detection circuit 203 based on the line-of-sight position, and performs AF processing in response to a user's operation.

<Description of Filter Processing>

Figure 8:
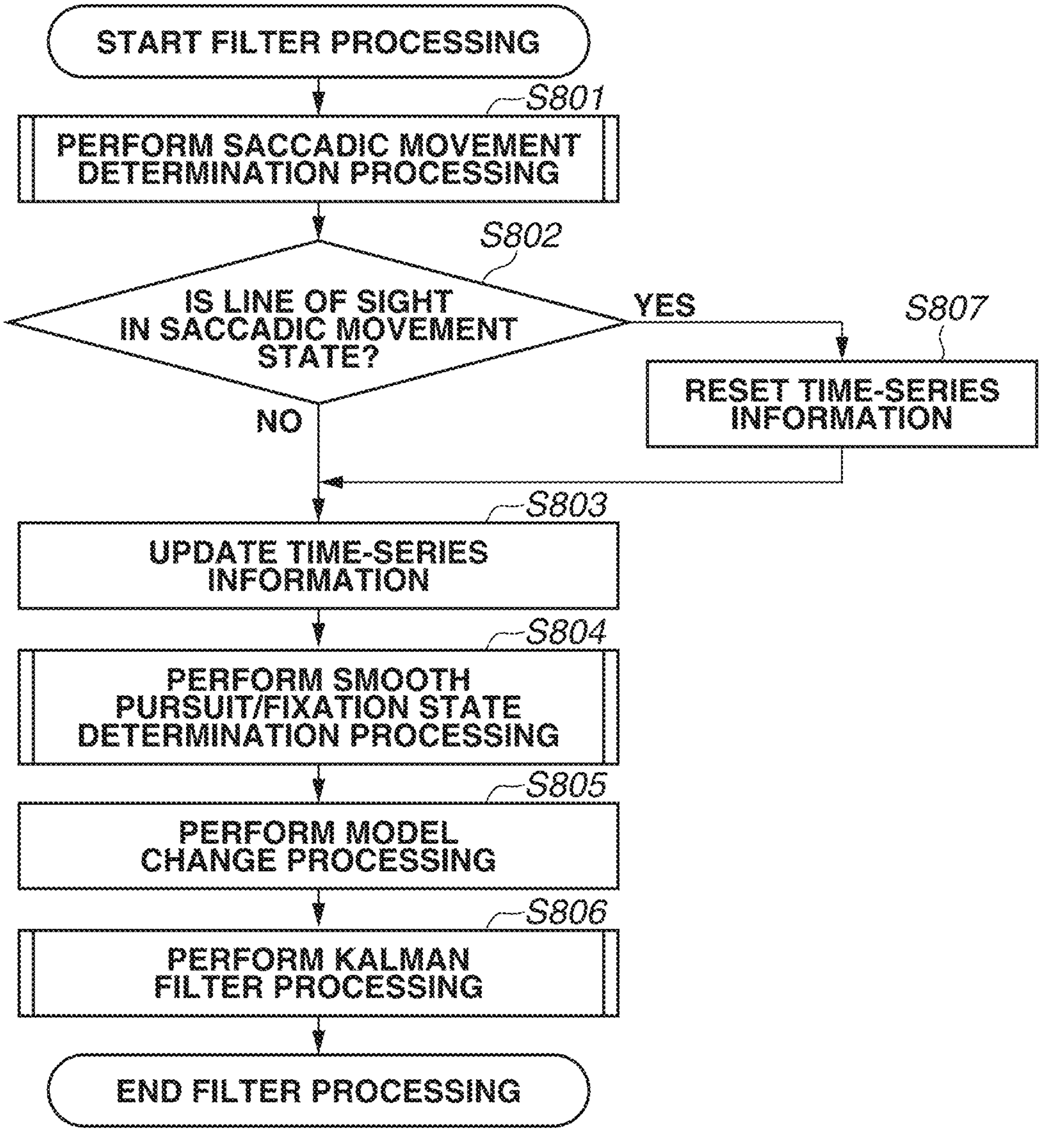
FIG. 8 is a flowchart illustrating a process of determining a line-of-sight state and Kalman filter processing suitable for each state according to one or more aspects of the present disclosure.
Figure 9:
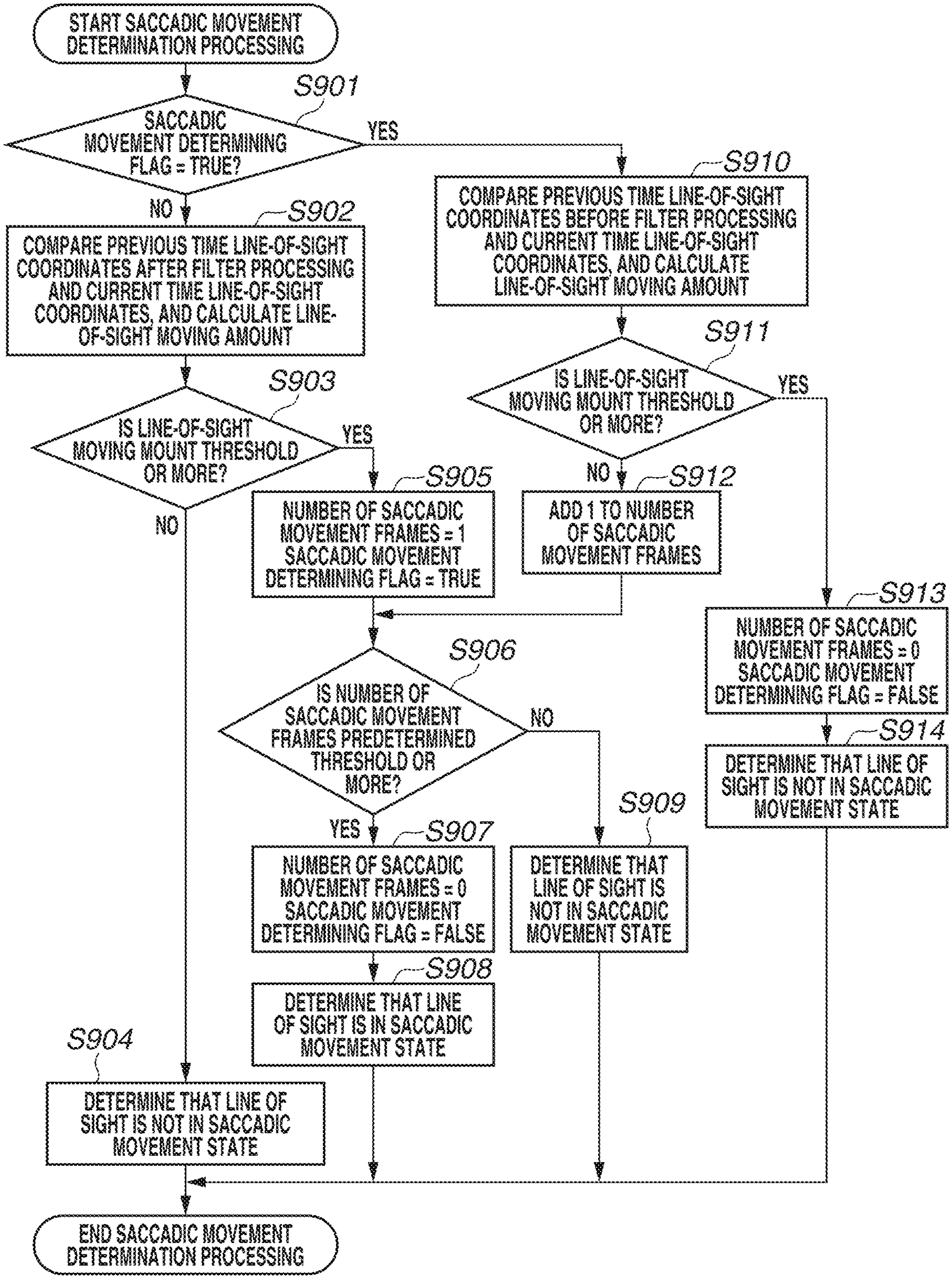
FIG. 9 is a flowchart illustrating saccadic movement determination processing according to one or more aspects of the present disclosure.
Figure 10:
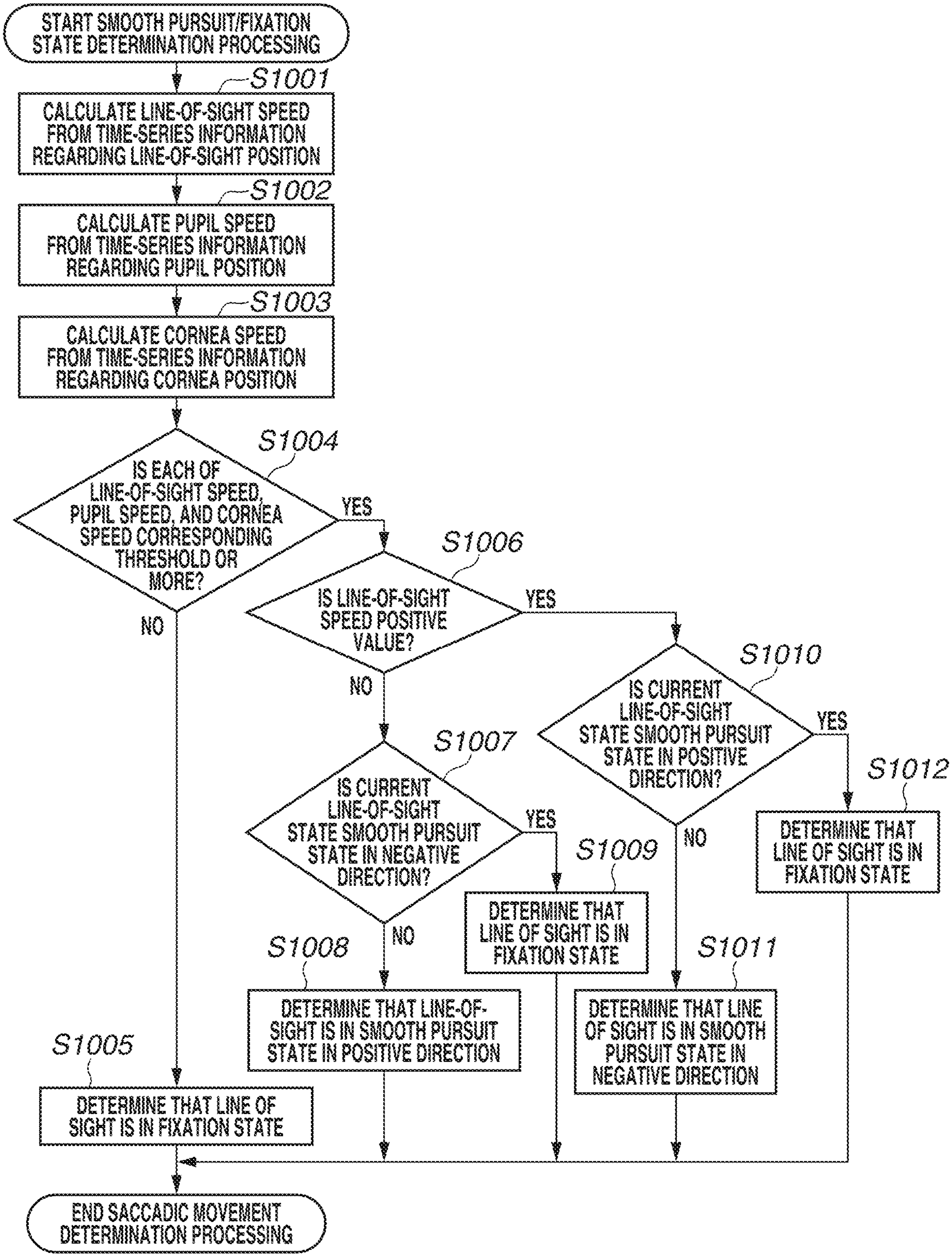
FIG. 10 is a flowchart illustrating smooth pursuit or fixation state determination processing according to the present exemplary embodiment.

FIGS. 8, 9, and 10 are flowcharts each illustrating in detail the filter processing in step S710 in FIG. 7. Specifically, FIGS. 8 to 10 are the flowcharts for performing processing using Kalman filters suitable for line-of-sight states. Behavior of the line of sight can be classified into three main states (a fixation state, a smooth pursuit state, and a saccadic movement state), and the optimum filter processing varies for each state.

The fixation state represents a state where the eye gazes at one point. The smooth pursuit state represents a state where the eye slowly and smoothly pursues an object. The saccadic movement state represents a state where the line of sight has moved significantly, i.e., saccadic eye movement occurs. FIG. 8 is a flowchart illustrating a process of determining a line-of-sight state and Kalman filter processing suitable for each state.

In step S801, the CPU 3 performs saccadic movement determination processing. The saccadic movement determination processing will be described below with reference to FIG. 9.

In step S802, the CPU 3 determines whether the line-of-sight state is the saccadic movement state based on a result of the saccadic movement determination processing. If the CPU 3 determines that the line-of-sight state is the saccadic movement state (YES in step S802), the processing proceeds to step S807. Otherwise (NO in step S802), the processing proceeds to step S803.

In step S803, the CPU 3 adds information regarding the current line-of-sight position, which has been determined not to be in the saccadic movement state, to information regarding the line of sight in the past (time-series information) to update the time-series information.

In other words, the CPU 3 stores the time-series information including the current line-of-sight position information in the memory unit 4. If the storage capacity of the memory unit 4 is fully used at the time of updating the time-series information, the CPU 3 deletes information regarding the oldest line-of-sight position, and stores the information regarding the current line-of-sight position as the time-series information. Specifically, the time-series information described herein is the line-of-sight position (Hx, Hy), the coordinates of the reflection images Pd' and Pe', and the coordinates of the image c' of the pupil center c after the line-of-sight detection processing, or after the filter processing or the interpolation processing if the filter processing or the interpolation processing has been performed.

In step S804, the CPU 3 performs smooth pursuit or fixation state determination processing. The smooth pursuit or fixation state determination processing will be described with reference to FIG. 10.

In step S805, the CPU 3 switches the parameters used for Kalman filters based on the determined line-of-sight state, and performs model change processing to change the Kalman filter models.

In this case, variables used in the Kalman filter are initialized, and values of the state-space model coefficients $G_t$ and $F_t$ set during the Kalman filter processing are switched based on the line-of-sight state. The variables and coefficients to be used in the Kalman filter will be described below with reference to FIG. 12.

In step S806, the CPU 3 performs the Kalman filter processing.

In step S807, the CPU 3 resets information regarding the line-of-sight position in the past (the time-series information) that is earlier than the current line-of-sight position which has been determined to be the saccadic movement state. In other words, the CPU 3 deletes the time-series information stored in the memory unit 4 and returns the memory unit 4 to a state where no time-series information is stored.

<Saccadic Movement Determination Processing>

FIG. 9 is a flowchart illustrating the saccadic movement determination processing. The CPU 3 uses a plurality of previous frames that are earlier than a current frame.

In step S901, the CPU 3 determines whether a saccadic movement determining flag is set. If the CPU 3 determines that the saccadic movement determining flag is not set (NO in step S901), the processing proceeds to step S902. If the CPU 3 determines that the saccadic movement determining flag is set (YES in step S901), the processing proceeds to step S910. The saccadic movement determining flag being set means a case where the CPU 3 has determined that a line-of-sight state is highly likely to be the saccadic movement state in the previous frame. The saccadic movement determining flag being not set means a case where there is no frame in which a line-of-sight state has been determined to be the saccadic movement state, even in the previous frame.

In step S902, the CPU 3 compares the previous line-of-sight position after the Kalman filter processing or the interpolation processing and the current line-of-sight position to calculate a line-of-sight moving amount. In this case, since there is no frame where a line-of-sight state has been determined to be the saccadic movement state, even in the previous frame, the CPU 3 uses the line-of-sight position subjected to the Kalman filter processing or the interpolation processing, which is less affected by noise or line-of-sight detection error.

In step S903, the CPU 3 determines whether the line-of-sight moving amount is a predetermined threshold or more. If the CPU 3 determines that the line-of-sight moving amount is the predetermined threshold or more (YES in step S903), the processing proceeds to step S905. Otherwise (NO in step S903), the processing proceeds to step S904.

In step S904, the CPU 3 determines that the line-of-sight state is not the saccadic movement state, and the saccadic movement determination processing ends.

In step S905, the CPU 3 sets the number of saccadic movement frames to one and the saccadic movement determining flag to true.

In step S906, the CPU 3 determines whether the number of saccadic movement frames is a predetermined threshold or more. If the CPU 3 determines that the number of saccadic movement frames is the predetermined threshold or more (YES in step S906), the processing proceeds to step S907. Otherwise (NO in step S906), the processing proceeds to step S909.

In step S907, the CPU 3 sets the number of saccadic movement frames to zero and the saccadic movement determining flag to false.

In step S908, the CPU 3 determines that the line-of-sight state is the saccadic movement state.

In step S909, the CPU 3 determines that the line-of-sight state is not the saccadic movement state.

In step S910, the CPU 3 compares the previous line-of-sight position before the Kalman filter processing or the interpolation processing and the current line-of-sight position to calculate the line-of-sight moving amount. Since the CPU 3 has determined that a line-of-sight state is highly likely to be the saccadic movement state also in the previous frame, it is necessary to verify whether the determination of a line-of-sight state to be highly likely to be the saccadic movement state is correct. Thus, when the line-of-sight moving amount is calculated, the CPU 3 uses a previous line-of-sight position including the effect of noise and line-of-sight detection error before the Kalman filter processing or the interpolation processing.

In step S911, the CPU 3 determines whether the line-of-sight moving amount is a predetermined threshold or more. If the CPU 3 determines that the line-of-sight moving amount is the predetermined threshold or more (YES in step S911), the processing proceeds to step S913. Otherwise (NO in step S911), the processing proceeds to step S912.

In step S912, the CPU 3 adds one to the number of saccadic movement frames, and the processing proceeds to step S906. After a saccadic movement occurs, the line-of-sight moving amount is a small value. Thus, if the line-of-sight moving amount is less than the predetermined threshold, the CPU 3 determines that the saccadic movement has occurred, and the processing proceeds to step S906.

In step S913, the CPU 3 sets the number of saccadic frames to zero and the saccadic determining flag to false. If the line-of-sight moving amount is the predetermined threshold or more, it is considered that the CPU 3 has erroneously determined the line-of-sight state to be the saccadic movement state due to noise or line-of-sight detection error, and the processing proceeds to step S914.

In step S914, the CPU 3 determines that the line-of-sight state is not the saccadic movement state.

<Smooth Pursuit or Fixation State Determination Processing>

FIG. 10 is a flowchart illustrating the smooth pursuit or fixation state determination processing in step S804 in FIG. 10.

In step S1001, the CPU 3 uses the line-of-sight position (Hx, Hy) in the time-series information stored in the memory unit 4 to calculate a line-of-sight speed.

In step S1002, the CPU 3 uses the coordinates of the image c' of the pupil center c in the time-series information to calculate a pupil speed.

In step S1003, the CPU 3 uses the coordinates of the reflection images Pd' and Pe' in the time-series information to calculate a cornea speed.

In step S1004, the CPU 3 determines whether the line-of-sight speed, the pupil speed, and the cornea speed is each a corresponding threshold or more. If the line-of-sight speed, the pupil speed, and the cornea speed is each the corresponding threshold or more (YES in step S1004), the processing proceeds to step S1006. If least one of the line-of-sight speed, the pupil speed, and the cornea speed is less than the corresponding threshold (NO in step S1004), the processing proceeds to step S1005. As the line-of-sight position changes, the pupil position and the cornea position also change. Thus, the line-of-sight position is less affected by noise or line-of-sight detection error if the line-of-sight speed, the pupil speed, and the cornea speed are taken into account as compared with a case where the line-of-sight speed alone is taken into account.

In step S1005, the CPU 3 determines that the line-of-sight state is the fixation state, and the smooth pursuit or fixation state determination processing ends.

In step S1006, the CPU 3 determines whether the line-of-sight speed is a positive value of zero or more. If the line-of-sight speed is a positive value of zero or more (YES in step S1006), the processing proceeds to step S1010. If the line-of-sight speed is a negative value of less than zero (NO in step S1006), the processing proceeds to step S1007.

In step S1007, the CPU 3 determines whether the current line-of-sight state is the smooth pursuit state in a negative direction. If the CPU 3 determines that the line-of-sight state is the smooth pursuit state in the negative direction (YES in step S1007), the processing proceeds to step S1009. If the CPU 3 determines that the line-of-sight state is not the smooth pursuit state in the negative direction (NO in step S1007), the processing proceeds to step S1008.

Figure 11A:
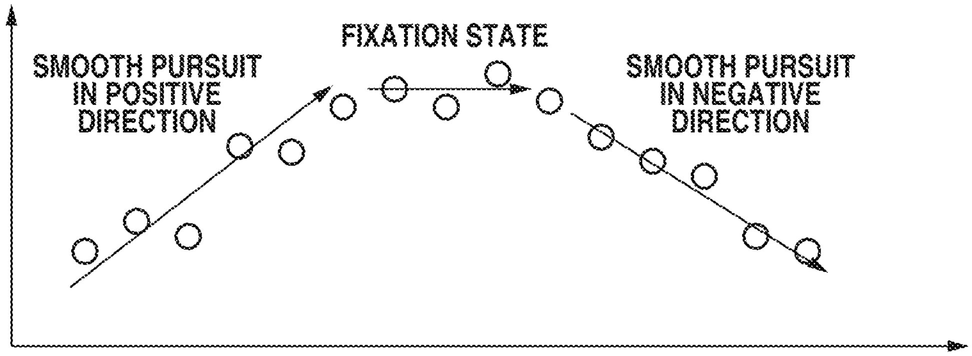
FIGS. 11A and 11B are schematic diagrams each illustrating line-of-sight movement according to one or more aspects of the present disclosure.
Figure 11B:
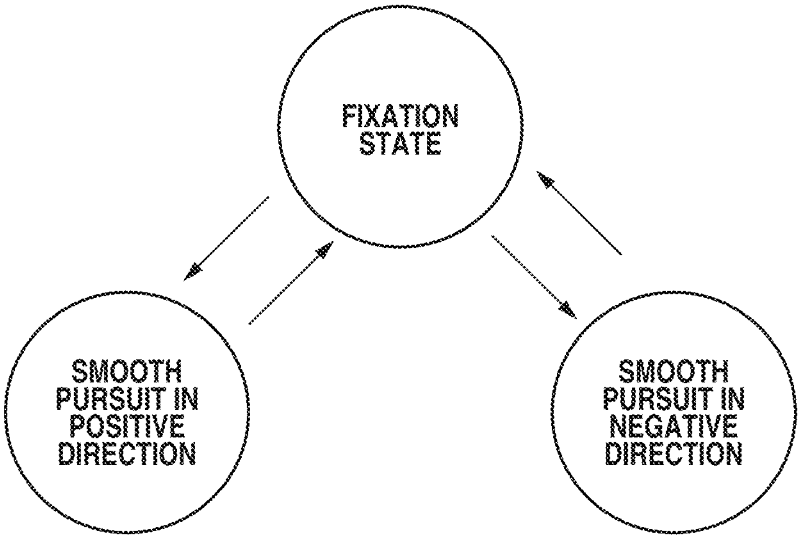

FIGS. 11A and 11B are schematic diagrams each illustrating a line-of-sight movement according to the present exemplary embodiment. As illustrated in FIG. 11A, if the line-of-sight detection can be performed at a sufficient frame rate when the direction is changed during the smooth pursuit movement of the line of sight, the line-of-sight speed approaches zero (0), allowing the detection of a timing when the line of sight is in the fixation state. Thus, even when a state transition between the positive (the positive direction) and the negative (the negative direction) of the smooth pursuit movement is detected, the fixation state is interposed between the smooth pursuit state in the positive direction and the smooth pursuit state in the negative direction at the time of switching between the smooth pursuit state in the positive direction and the smooth pursuit state in the negative direction.

In step S1008, the CPU 3 determines that the line-of-sight state is the smooth pursuit state in the positive direction, and the smooth pursuit or fixation state determination processing ends.

In step S1009, the CPU 3 determines that the line-of-sight state is the fixation state, and the smooth pursuit or fixation state determination processing ends.

In step S1010, the CPU 3 determines whether the current line-of-sight state is the smooth pursuit state in the positive direction. If the CPU 3 determines that the line-of-sight state is the smooth pursuit state in the positive direction (YES in step S1010), the processing proceeds to step S1012. If the CPU 3 determines that the line-of-sight state is not the smooth pursuit state in the positive direction (NO in step S1010), the processing proceeds to step S1011.

In step S1011, the CPU 3 determines that the line-of-sight state is the smooth pursuit state in the negative direction, and the smooth pursuit or fixation state determination processing ends.

In step S1012, the CPU 3 determines that the line-of-sight state is the fixation state, and the smooth pursuit or fixation state determination processing ends.

<Regarding Kalman Filter Processing>

Figure 12:
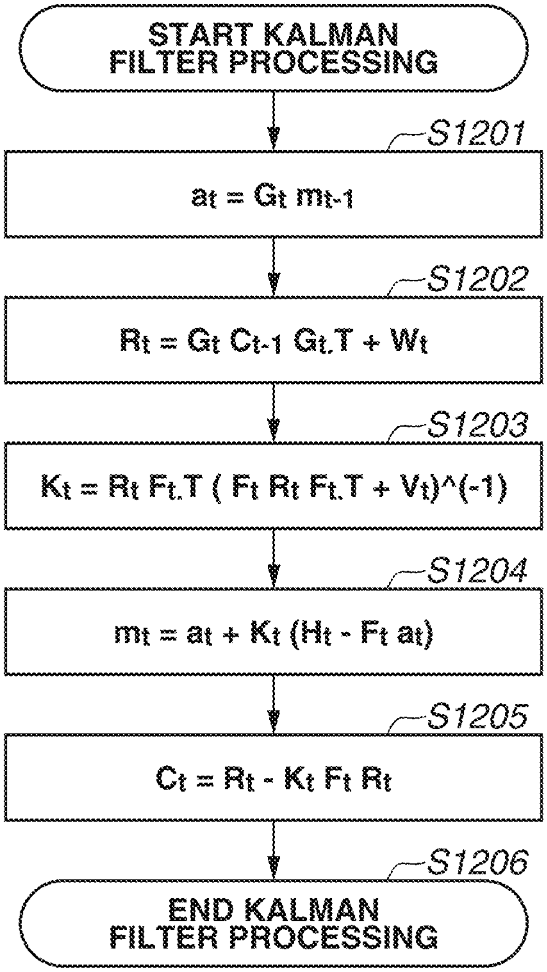
FIG. 12 is a flowchart of Kalman filter processing according to one or more aspects of the present disclosure.

FIG. 12 is a flowchart illustrating the Kalman filter processing.

Kalman filter is a method that uses previous observation values to determine the current line-of-sight position using statistical technique. The state space model is defined by expression (1).

$$x_t = G_t x_{t-1} + w_t \tag{1}$$
$$y_t = F_t x_t + v_t$$

In this expression, $x_t$ represents a state vector, $y_t$ represents an observation vector, $G_t$ and $F_t$ represent known coefficients, $w_t$ represents a model error, and $v_t$ represents an observation error. Both $w_t$ and $v_t$ are zero-mean Gaussian white noise with known variances for $w_t$ and $v_t$, respectively.

Here, the known values of $G_t$ and $F_t$ are changed depending on the line-of-sight state.

In step S1201, the CPU 3 uses expression (2) to calculate a prior estimation value at at a time t.

$$a_t = G_t m_{t-1} \tag{2}$$

In this expression, $m_{t-1}$ is a state estimation value at a time t−1. An element of $m_{t-1}$ includes a line-of-sight position after the filter processing or the interpolation processing at the previous time step.

In step S1202, the CPU 3 uses expression (3) to obtain a prior error covariance matrix $R_t$ using the calculated prior estimation value at.

$$R_t = G_t C_{t-1} G_t^T + W_t \tag{3}$$

In this expression, $C_{t-1}$ is a posterior error covariance matrix at the time t−1.

In step S1203, the CPU 3 uses expression (4) to calculate a Kalman gain $K_t$.

$$K_t = R_t F_t^T \left(F_t R_t F_t^T + V_t\right)^{-1} \tag{4}$$

In step S1204, the CPU 3 uses expression (5) to calculate a state estimation value $m_t$ at the time t.

$$m_t = a_t + K_t(H_t - F_t a_t) \tag{5}$$

In this expression, $H_t$ represents a line-of-sight position before the filter processing or the interpolation processing at the time t. An element of the state estimation value $m_t$ includes a line-of-sight position after the filter processing or the interpolation processing.

In step S1206, the CPU 3 uses expression (6) to calculate the posterior error covariance matrix at the time t and the Kalman filter processing ends.

$$C_t = R_t - K_t F_t R_t \quad (6)$$

The coefficients $G_t$ and $F_t$ in the state space model to be set by the Kalman filter processing are determined based on the line-of-sight state. When the line-of-sight state is the fixation state, the eye gazes at a single point, and thus the CPU 3 uses a stationary model to estimate that a prediction value is the same as that of the current line-of-sight position. The stationary model is designed based on the assumption that a state of the subject does not change over time, or that changes in the state of the subject are minimal over time. In this case, the coefficients $G_t$ and $F_t$ are each one. When the line-of-sight state is the smooth pursuit state or the saccadic movement state, the CPU 3 estimates that the line of sight moves at a constant speed, and uses either a constant speed model or constant velocity motion. In this case, the coefficients $G_t$ and $F_t$ are expressed by expression (7).

$$G_t = \begin{bmatrix} 1 & dt \\ 0 & 1 \end{bmatrix} \quad (7)$$

$$F_t = \begin{bmatrix} 1 \\ 0 \end{bmatrix}$$

In this expression, dt is a difference between the time t and the time t−1.

In the present exemplary embodiment, the state space model is set as described above, but the configuration is not limited thereto. The CPU 3 can use, for example, a model including a term of an acceleration rate.

As values of $w_t$ and $v_t$ in the expression (3) or (4) increase, a cut-off frequency takes a lower value. The cut-off frequency taking a lower value means that signals in the lower frequency band alone are allowed to pass, increasing the strength of the Kalman filter. On the other hand, as values of $w_t$ and $v_t$ in the expression (3) or (4) decrease, a cut-off frequency takes a higher value. The cut-off frequency taking a higher value means that signals in the higher frequency band are allowed to pass, decreasing the strength of the Kalman filter.

As the strength of the Kalman filter is increased, the variation in the image to be displayed in response to a change in the line-of-sight position is reduced. However, this also results in greater delay between the change in the line-of-sight position and the display of the image based on the new line-of-sight position. To address this, the user can switch settings to prioritize either reducing the variation in the image to be displayed in response to the change in the line-of-sight position or minimizing the delay between the change in the line-of-sight position and the display of an image based on the new line-of-sight position.

Figure 13:
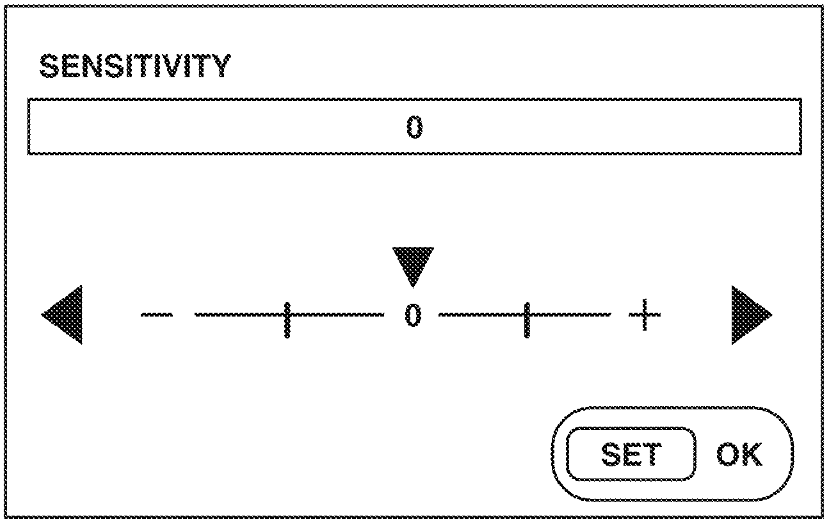
FIG. 13 illustrates an example of a display screen on which a user makes a setting for the gain of a Kalman filter according to one or more aspects of the present disclosure.

FIG. 13 illustrates an example of a display screen on which the user makes a setting regarding the strength of the Kalman filter according to the present exemplary embodiment. FIG. 13 illustrates a screen that allows the user to adjust the sensitivity of line-of-sight pointer movement. When the user performs an operation of the operation unit 204 to display a setting screen regarding the sensitivity of the line-of-sight pointer, the screen in FIG. 13 is displayed on the liquid crystal display unit 120. When the user operates the operation unit 204 to move a selection bar from zero to a negative side on the display screen, the strength of the Kalman filter becomes lower, which makes it possible to make a setting to reduce the delay more significantly. In this case, the variation of the line-of-sight position in response to a change in the line-of-sight position increase. On the other hand, when the selection bar is moved from zero to a positive side, the strength of the Kalman filter becomes higher, which makes it possible to reduce variation in the line-of-sight pointer at the line-of-sight position more significantly. In this case, the delay between the change in the line-of-sight position and the display of an image indicating the line-of-sight position increases.

If the user has set the delay to be small and the line-of-sight state is determined to be the saccadic movement state, the CPU 3 resets the observation value, the state estimation value m, and the posterior error covariance matrix to the values before the line-of-sight state has been determined to be the saccadic movement state.

Other Exemplary Embodiments

The above-described various kinds of control performed by the CPU 3 can be performed by a piece of hardware, or the control of the entire imaging apparatus can be shared by a plurality of pieces of hardware (for example, a plurality of processors or circuits).

The present disclosure has been described in detail based on the exemplary embodiments, but is not limited to the specific embodiments. Various modes without departing from the gist of the present disclosure are also included in the present disclosure. Furthermore, each of the above-described exemplary embodiments is merely one exemplary embodiment of the present disclosure, and the exemplary embodiments can be combined as appropriate.

According to the present disclosure, jitter and delay of an image displayed based on a line-of-sight position can be reduced.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-100267, filed Jun. 21, 2024, which is hereby incorporated by reference herein in its entirety.

What is claimed is:

1. An electronic apparatus comprising:

one or more memories; and one or more processors in communication with the one or more memories, wherein the one or more processors and the one or more memories are configured to:

acquire line-of-sight information including a line-of-sight position of a line of sight of a user who looks at a display unit;

correct the acquired line-of-sight position by performing filter processing;

determine whether a line-of-sight state is any one of at least two or more line-of-sight states depending on a line-of-sight speed and an amount of a line-of-sight movement included in the acquired line-of-sight information;

perform control to execute processing of displaying an image based on the corrected line-of-sight position; and perform control to change a parameter for the filter processing to be used in the correction based on the determined line-of-sight state.

2. The electronic apparatus according to claim 1, wherein the filter processing is processing using a Kalman filter.

3. The electronic apparatus according to claim 2, wherein the one or more processors and the one or more memories are configured to perform control to change a model of the Kalman filter based on the determined line-of-sight state.

4. The electronic apparatus according to claim 3, wherein, in a case where the line-of-sight state is determined to be a fixation state, the one or more processors and the one or more memories are configured to perform control to change the model of the Kalman filter to a stationary model.

5. The electronic apparatus according to claim 3, wherein, in a case where the line-of-sight state is determined to be a smooth pursuit state or a saccadic movement state, the one or more processors and the one or more memories are configured to perform control to switch the model of the Kalman filter to a constant speed model or constant velocity model.

6. The electronic apparatus according to claim 1, wherein the one or more processors and the one or more memories are configured to determine whether the line-of-sight state is a saccadic movement state, a fixation state, or a smooth pursuit state based on the line-of-sight speed and the amount of line-of-sight movement in the acquired line-of-sight information.

7. The electronic apparatus according to claim 1, wherein the one or more processors and the one or more memories are further configured to:

make a setting regarding an image to be displayed based on the user's line-of-sight position; and perform control to set strength of a filter of the filter processing depending on a state of the setting.

8. The electronic apparatus according to claim 7, wherein the setting is a setting regarding a delay until the image is displayed at a position based on the line-of-sight position acquired.

9. The electronic apparatus according to claim 8, wherein the delay until the image is displayed at the position based on the acquired line-of-sight position increases as the strength of the filter becomes higher.

10. The electronic apparatus according to claim 7, wherein, in a case where the line-of-sight state is determined to be a saccadic movement state, the one or more processors and the one or more memories are configured to perform control to display the image based on the line-of-sight position without changing a value of the acquired line-of-sight position.

11. The electronic apparatus according to claim 1, wherein the one or more processors and the one or more memories are configured to perform control to display a line-of-sight pointer or a highlighted autofocus (AF) frame at a position based on the corrected line-of-sight position.

12. A method of controlling an electronic apparatus, the method comprising:

acquiring line-of-sight information including a line-of-sight position of a line of sight of a user who looks at a display unit;

correcting the line-of-sight position acquired by performing filter processing;

performing a state determination to determine at least two or more line-of-sight states depending on a line-of-sight speed and an amount of line-of-sight movement based on the acquired line-of-sight position;

performing control to execute processing of displaying an image based on the corrected line-of-sight position; and performing control to change a parameter for the filter processing to be used in the correction based on the line-of-sight state determined by a state determination unit.

13. A non-transitory computer-readable storage medium that stores a program to cause a computer to execute a method of controlling a electronic apparatus, the method comprising:

acquiring line-of-sight information including a line-of-sight position of a line of sight of a user who looks at a display unit;

correcting the line-of-sight position acquired by performing filter processing;

performing a state determination to determine at least two or more line-of-sight states depending on a line-of-sight speed and an amount of line-of-sight movement based on the acquired line-of-sight position;

performing control to execute processing of displaying an image based on the corrected line-of-sight position; and performing control to change a parameter for the filter processing to be used in the correction based on the line-of-sight state determined by a state determination unit.

* * * * *